US012404066B2

(12) United States Patent
Bardini

(10) Patent No.: US 12,404,066 B2
(45) Date of Patent: Sep. 2, 2025

(54) LABELING MACHINE

(71) Applicant: P.E. LABELLERS S.P.A., Porto Mantovano (IT)

(72) Inventor: Riccardo Bardini, Torri del Benaco (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 78 days.

(21) Appl. No.: 18/284,088

(22) PCT Filed: Sep. 16, 2021

(86) PCT No.: PCT/EP2021/075459
§ 371 (c)(1),
(2) Date: Sep. 26, 2023

(87) PCT Pub. No.: WO2022/207130
PCT Pub. Date: Oct. 6, 2022

(65) Prior Publication Data

US 2024/0166398 A1 May 23, 2024

(30) Foreign Application Priority Data

Mar. 30, 2021 (IT) ........................ 102021000007778

(51) Int. Cl.
*B65C 9/18* (2006.01)
*B65C 9/00* (2006.01)
(Continued)

(52) U.S. Cl.
CPC .............. *B65C 9/1819* (2013.01); *B65C 9/02* (2013.01); *B65C 9/226* (2013.01); *B65C 2009/0075* (2013.01)

(58) Field of Classification Search
CPC ............. B65C 9/1819; Y10T 156/1033; B32B 38/1858
See application file for complete search history.

(56) References Cited

U.S. PATENT DOCUMENTS 4,632,721 A * 12/1986 Hoffmann ................. B65C 9/36 156/578
4,724,036 A 2/1988 Hill et al.
(Continued)

FOREIGN PATENT DOCUMENTS

DE 37 01 146 A1 8/1987
EP 3 181 469 A1 6/2017
(Continued)

OTHER PUBLICATIONS

International Search Report and Written Opinion issued Dec. 15, 2021 which pertains to PCT Patent Application No. PCT/EP2021/075459 filed Sep. 16, 2021. 7 pages.

*Primary Examiner* — Carson Gross
(74) *Attorney, Agent, or Firm* — THOMPSON HINE LLP

(57) ABSTRACT

A labeling machine includes a conveyor to move containers to be labeled along an advancement path and at least one labeling station arranged along the advancement path. The labeling station includes an unreeling assembly for a label ribbon, on which multiple labels are printed in succession, and at least one drum designed to receive on its lateral surface the label ribbon or the labels obtained by cutting the label ribbon. At least one skid is arranged at the peripheral region of the drum and has at least one relief portion with the relief directed outward with respect to the remaining part of the lateral surface of the drum. At least one glue roller is arranged laterally to the drum. At least the relief portion of the skid is made of an elastically yielding material.

5 Claims, 8 Drawing Sheets

(51) Int. Cl.
*B65C 9/02* (2006.01)
*B65C 9/22* (2006.01)

(56) References Cited

U.S. PATENT DOCUMENTS

| | | | | |
|---|---|---|---|---|
| 2001/0017181 | A1* | 8/2001 | Otruba | B65C 9/1819 156/64 |
| 2017/0166344 | A1* | 6/2017 | Carmichael | B65C 9/40 |

FOREIGN PATENT DOCUMENTS

| | | | |
|---|---|---|---|
| JP | S62208338 | A | 9/1987 |
| JP | 2002531341 | A | 9/2002 |
| JP | 2020514199 | A | 5/2020 |
| WO | 2018/114618 | A1 | 6/2018 |

* cited by examiner

LABELING MACHINE

The present invention relates to a labeling machine.

Labeling machines are known which make it possible to apply, on containers, labels that are obtained by cutting a continuous label ribbon.

The label ribbon can be of the pre-glued type, i.e. provided on the reel with preapplied portions of glue, in order to allow the adhesion thereof to the containers, or they can be without pre-applied glue and, in such case, the machine is provided with means that make it possible to apply the glue to the labels to be transferred to the containers, as will be better explained below.

Labeling machines are usually provided with a conveyor of the containers, which is constituted by a rotating carousel on the peripheral region of which there are rotating supporting pans for the individual containers, with which the containers are rotated about their axes.

One or more labeling stations are also arranged at the peripheral region of the carousel, each one applies a corresponding label to the containers transported by the carousel.

In particular, each labeling station is provided with an unreeling assembly that makes it possible to take the label ribbon from a reel, in order to feed it to a cutting drum, which is provided with blades for cutting the label ribbon at the separation region between one label and the next. Exiting from the cutting drum, the labels separated after cutting are transferred to a transfer drum, which brings the labels to adhere to the respective container arriving on the carousel.

In other machines, the functions of the cutting drum and of the transfer drum are carried out by a single drum, called a cutting and transfer drum, which makes it possible both to cut the label ribbon, using blades mounted thereon, and to transfer the cut labels to the corresponding containers.

In this case, the label ribbon is fed directly from the unreeling assembly to the cutting and transfer drum.

Labeling machines that are designed to use label ribbons without pre-applied glue have a gluing assembly, usually located in a position beside the transfer drum or beside the cutting and transfer drum, depending on the individual case.

In particular, the gluing assembly can, in turn, be constituted by a glue roller, i.e. by a roller that applies, on each one of the labels placed on the drum to which it is adjacent, two strips of glue, one at the leading edge of the individual label and the other one at the trailing edge of that label.

In particular, the drum on which application of the glue on the labels takes place is, typically, subdivided, along its circumferential extension, into multiple sectors or divisions, each one of which is designed to receive, in each instance, a single label.

At opposite ends of the various sectors are two gluing zones, which are in relief with respect to the remaining part of the lateral surface of the corresponding drum and are, basically, defined by respective blocks, usually called runners or skids, on which the leading and trailing edges of the labels come to rest, so that when the labels pass in front of the glue spreading roller, the latter applies only two strips of glue to those labels, at their leading and trailing edges.

Conventional machines have the drawback of requiring the utmost geometric precision not only in the construction of the drum and of the skids mounted on it, but also in the positioning of the glue roller with respect to the drum, in order to ensure that between the glue roller and the drum that carries the skids a pressure is generated that is such as to enable the correct application of the glue on the labels, but without interfering with the regular operation of the machine.

The aim of the present invention is to provide a labeling machine that is capable of improving the known art in one or more of the above mentioned aspects.

Within this aim, an object of the invention is to provide a labeling machine that enables the optimal application of glue on the labels without requiring the utmost precision in its implementation, as in the known art.

Another object of the invention is to provide a labeling machine that is capable of offering the highest guarantees of reliability and safety in its operation.

Furthermore, the present invention sets out to overcome the drawbacks of the background art in a manner that is alternative to any existing solutions.

Another object of the invention is to provide a labeling machine that is relatively easy to provide, so that it can be produced at low cost.

This aim and these and other objects which will become better apparent hereinafter are achieved by a labeling machine according to claim 1, optionally provided with one or more of the characteristics of the dependent claims.

Further characteristics and advantages of the invention will become better apparent from the description of a preferred, but not exclusive, embodiment of the labeling machine according to the invention, which is illustrated by way of non-limiting example in the accompanying drawings wherein.

Figure 1:
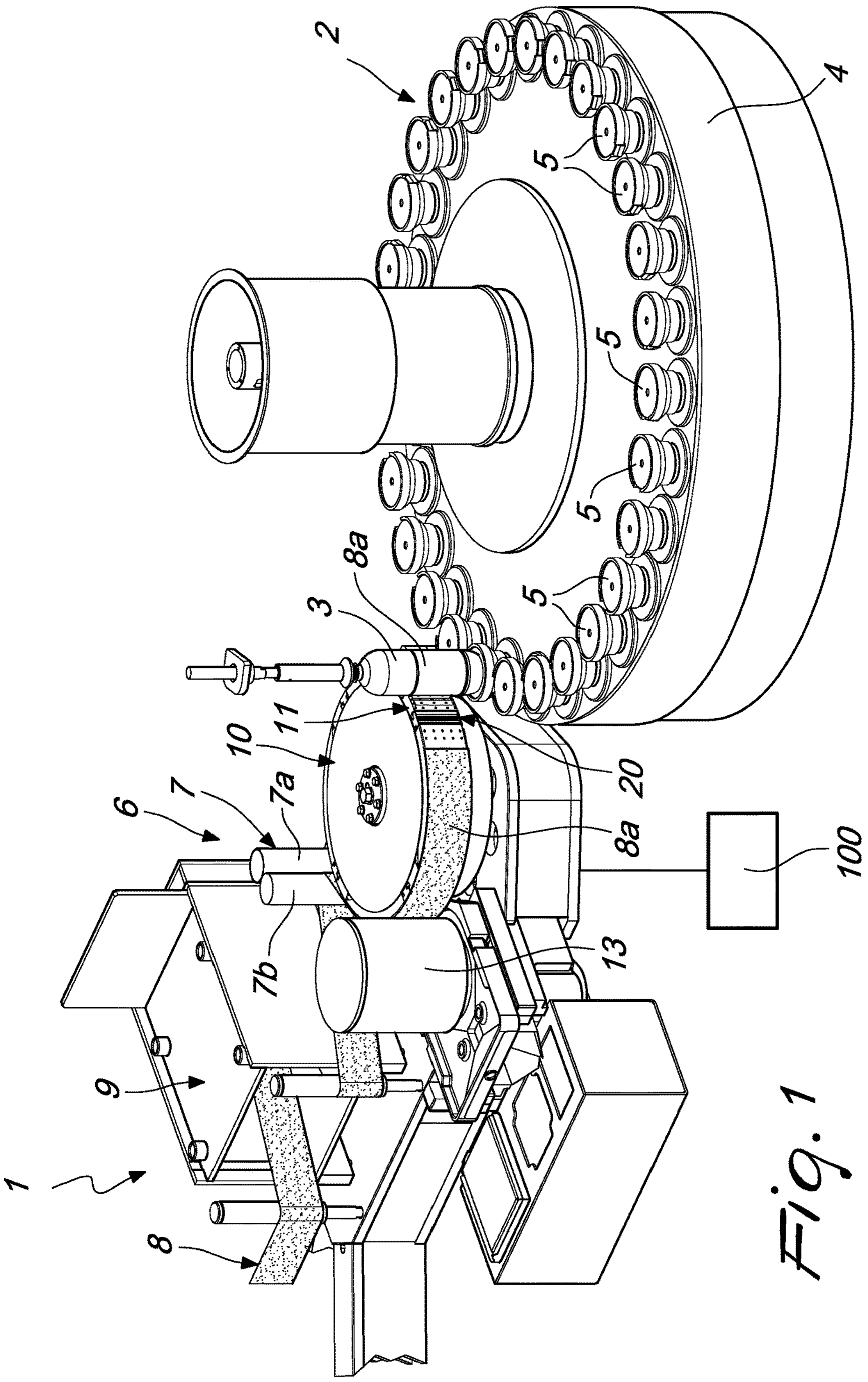
FIG. 1 is a partial perspective view of the labeling machine according to the invention.
Figure 2:
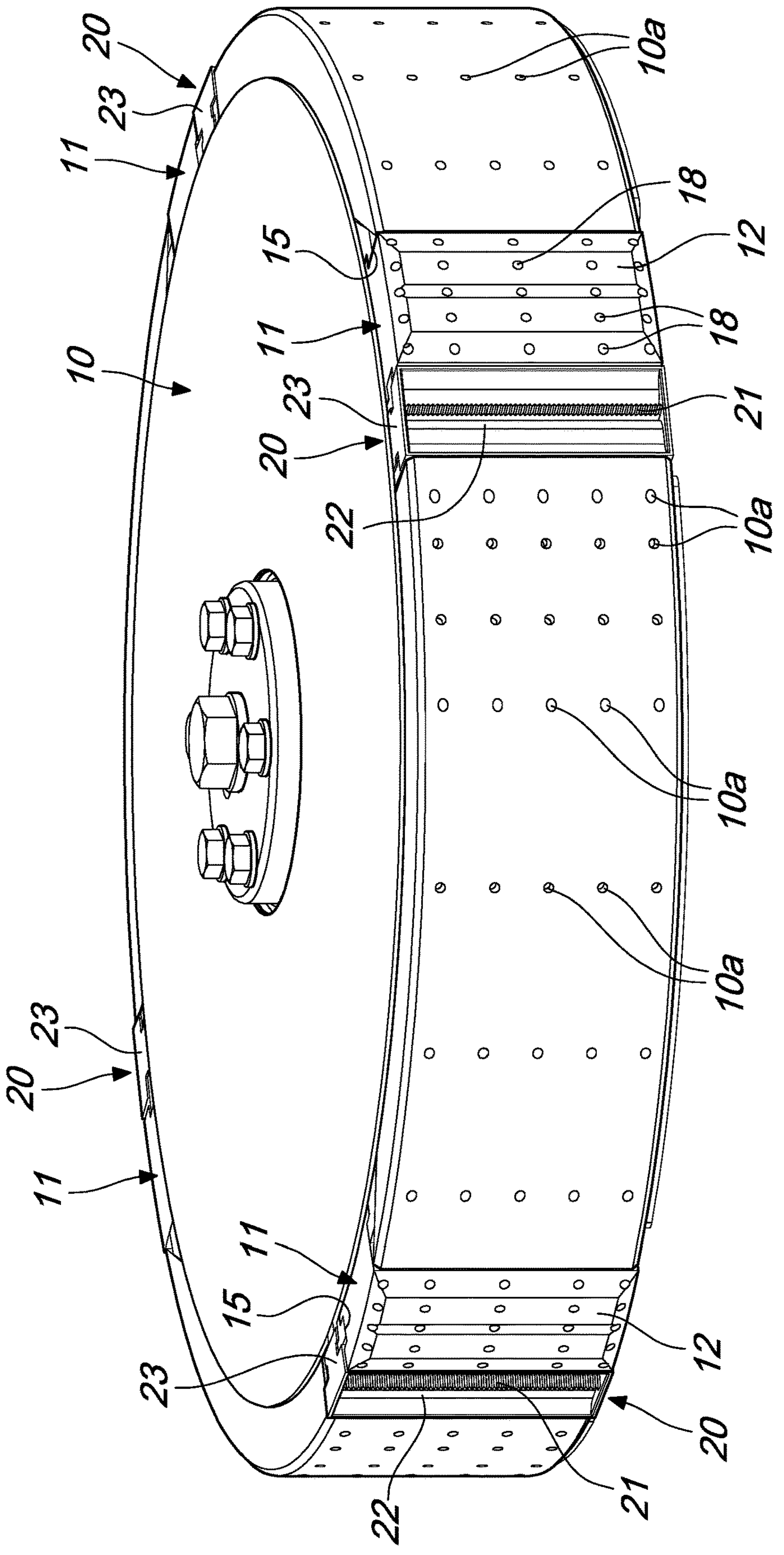
FIG. 2 is a perspective view of a drum of the machine according to the invention.
Figure 4:
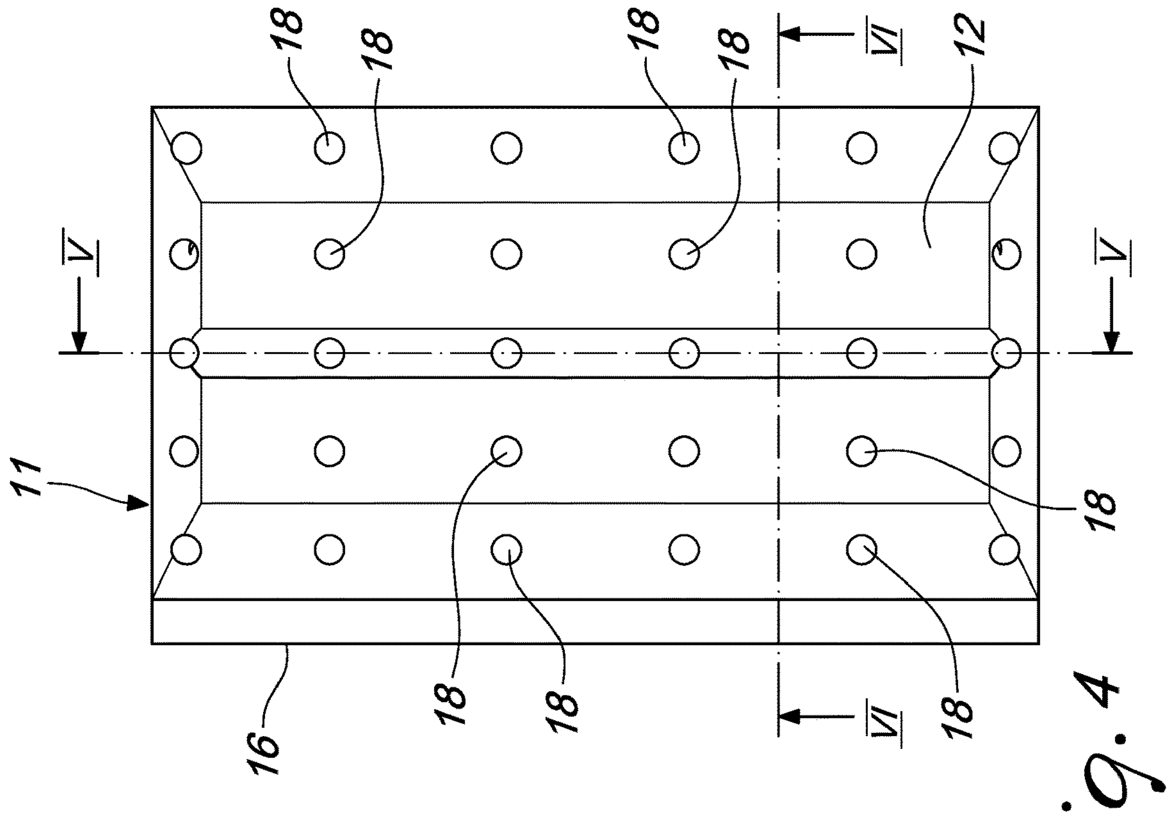
FIG. 4 is a front elevation view of the skid.
Figure 3:
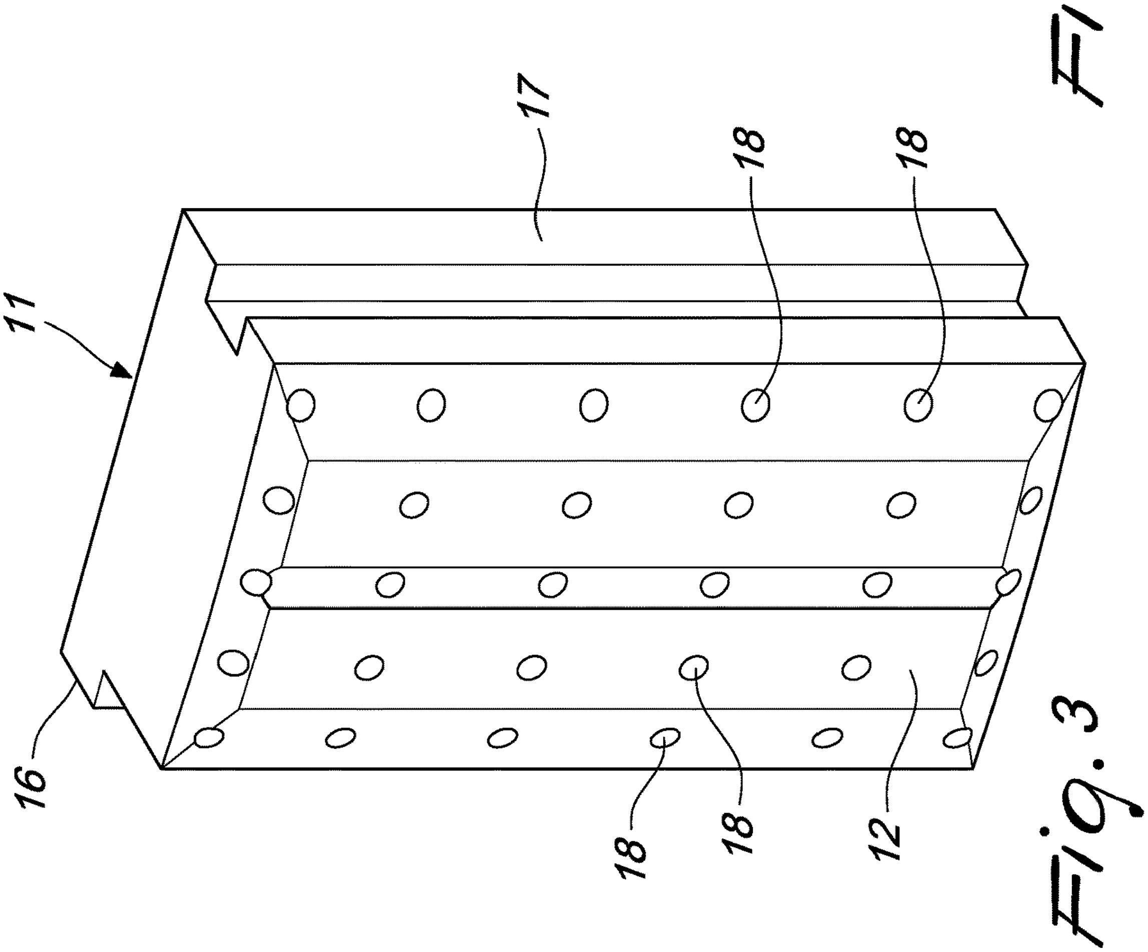
FIG. 3 is a perspective view of a skid of the machine according to the invention.
Figure 6:
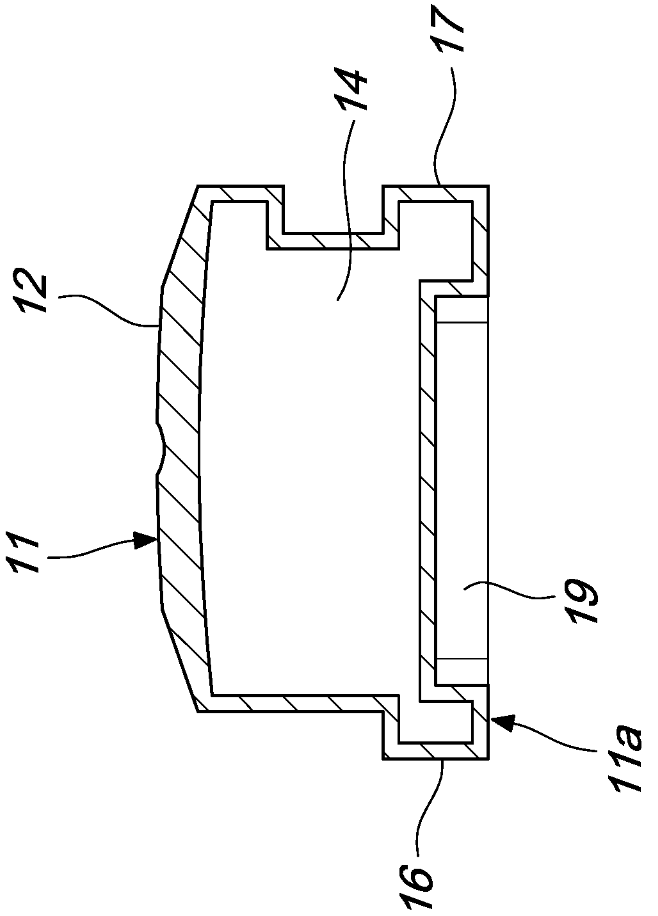
FIG. 6 is a cross-sectional view taken along the line VI-VI of FIG. 4.
Figure 5:
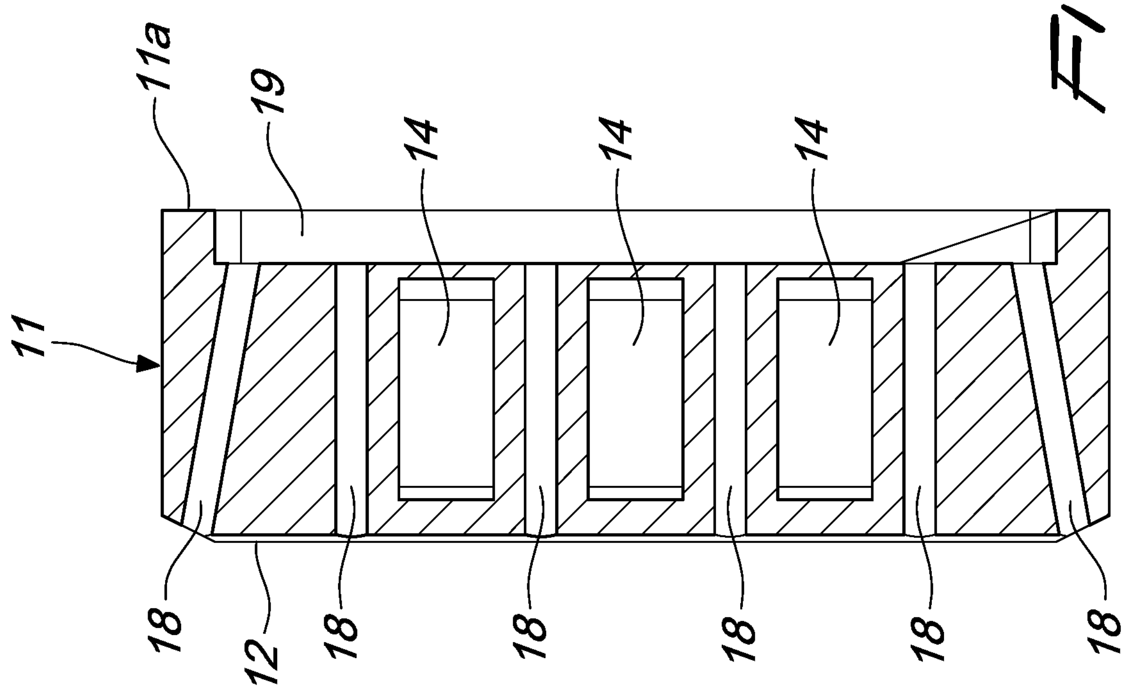
FIG. 5 is a cross-sectional view taken along the line V-V of FIG. 4.
Figure 8:
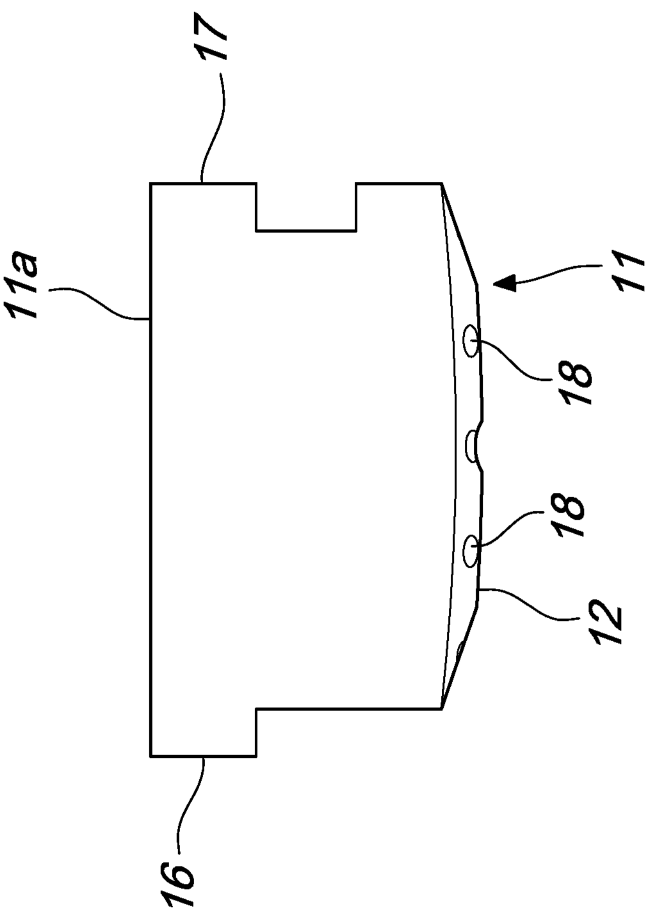
FIG. 8 is a plan view from above of the skid.
Figure 7:
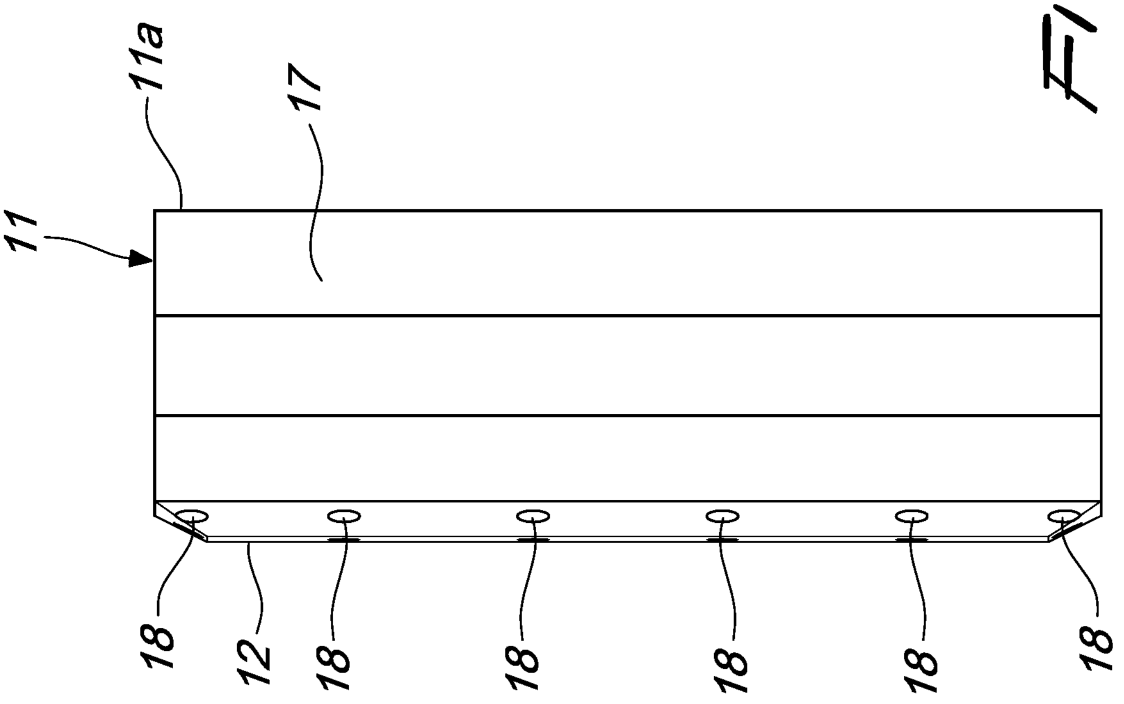
FIG. 7 is a side view of the skid.

With reference to the figures, the labeling machine according to the invention, generally designated by the reference numeral 1, comprises a conveyor 2 of the containers 3 to be labeled along an advancement path 2*a*.

Conveniently, the conveyor 2 is constituted by a rotating carousel 4 which has, at its peripheral region, supports 5 for individual containers 3 which are adapted to rotate the containers 3 about their axes.

Along the advancement path 2*a* of the containers 3, there is at least one labeling station 6, which comprises an unreeling assembly 7 for a label ribbon 8 on which a plurality of labels 8*a* are printed in succession.

The unreeling assembly 7 is, conveniently, constituted by a pair of mutually opposite entraining rollers 7*a*, 7*b*, which make it possible to take the label ribbon 8 from a reel, not shown, optionally making it pass through a tension adjustment device 9 for the label ribbon 8, as is known per se.

The labeling station 6 is further provided with at least one drum 10, which can move by rotation about its own axis and which is designed to receive, on its lateral surface, the label ribbon 8 or the labels 8*a* which are obtained by cutting the label ribbon.

Advantageously, on the lateral surface of the drum 10 there are suction openings 10*a*, which are connected, in a way that is known per se, to air suction means, for example constituted by a vacuum pump 100, in order to make it possible to retain the label ribbon 8 and the labels 8*a* so that they adhere to the lateral surface of the drum 10.

In particular, at least one skid 11 is arranged at the peripheral region of the drum 10 and has at least one portion 12 which is in relief directed outward with respect to the remaining part of the lateral surface of the drum 10.

At least one glue roller 13 is also arranged laterally to the drum 10 and its function is to apply a layer of glue at least to the regions of the labels 8*a* that are resting on the relief portion 12 of the skid 11, when the latter passes in front of the glue roller 13.

According to the invention, at least the relief portion 12 of the skid 11 is made of an elastically yielding material.

In this manner, the manufacture of the skid 11 and the arrangement of the glue roller 13 with respect to the drum 10 do not necessitate extreme precision, as in the known art, because the elastic deformability of the relief portion 12 of the skid 11 makes it possible to compensate any errors in construction or assembly.

Advantageously, the skid 11 is constituted by a respective body 11*a* made entirely from an elastically yielding material, such as, for example, rubber or any other polymeric material that has an adequate elastic deformability, like silicone, thermoplastic polyurethane or the like.

Conveniently, the skid 11 has at least one inner cavity 14, the function of which is to facilitate the elastic pliability at least of its relief portion 12.

As illustrated, the drum 10 can be provided with multiple skids 11, arranged so as to be mutually angularly spaced apart about the axis of the drum 10. In this case, each skid 11 is, advantageously, constituted by a body 11*a* made entirely of elastically deformable material.

It should be noted that, by virtue of the fact that it is made entirely of elastically deformable material, each skid 11 can be easily made even by 3D printing, which offers a certain freedom in the design of the shape that can be given to the body 11*a* of the skids 11, in addition to allowing the possibility of easily creating internal cavities 14 of various shapes and dimensions, not necessarily empty, but, possibly, provided for example with a honeycomb structure or the like or filled at least in part with materials with different elastic characteristics from the material of which the body 11*a* is made, and conveniently capable of differentiating the elasticity of the body 11*a* of the skids 11 from one region to another in an optimal manner.

Advantageously, each skid 11 can be removably attached to the drum 10 at a respective accommodation seat 15, which is defined at the peripheral region of the drum 10.

The insertion and extraction of the skids 11 into/out of the accommodation seats 15 can conveniently be carried out with a sliding movement of the skids 11 with respect to the drum 10, along a direction that is substantially parallel to the axis of the drum.

For the purpose of correctly guiding this sliding movement and ensuring the locking of the skids 11 inside the corresponding accommodation seat 15 in a radial direction, with respect to the axis of the drum 10, on the body 11*a* of the skids 11 there are, conveniently, elements, for example of the male/female type, that ensure its coupling in the accommodation seat 15. In particular, there can be, for example, on one of the mutually opposite flanks of the body 11*a* of each skid 11, at least one rib 16, which is designed to engage a corresponding groove defined in the accommodation seat 15, while, on the other flank, another rib 17 can be defined which engages, in turn, a corresponding groove which, again, is defined in the accommodation seat 15.

Conveniently, at least in the relief portion 12 of the skids 11, ports 18 are defined which can be connected to air suction means, which are constituted, for example, by the same vacuum pump 100 to which the opening[s] 10*a* of the drum 10 are connected, in order to enable the correct adhesion to the skids 11 of the regions of the labels 8*a* on which application of the glue is required by the glue roller 13.

Conveniently, the ports 18 pass through the body 11*a* of the skids 11 and communicate with a suction chamber 19, which is defined on the side of the skids 11 that is directed toward the inside of the drum 10 and is intended, in turn, to be placed in communication with the vacuum pump 100, when the skids 11 are positioned in the respective accommodation seat 15.

As illustrated, it is possible for at least one cutting device 20 to be mounted peripherally on the drum 10, and which can be actuated on command to cut the label ribbon 8.

For example, such cutting device 20 can be constituted by a blade 21 arranged inside a cutting chamber 22, defined in the drum 10 and open at the lateral surface of the drum.

In particular, the cutting chamber 22 can be connected with the vacuum pump 100 in order to allow the attraction of the label ribbon 8 toward the inside of the cutting chamber 22 and against the blade 21, so as to obtain the cutting thereof.

Conveniently, the cutting chamber 22 is provided inside a blade-supporting box-like body 23, which can be connected, preferably removably, to the drum 10.

According to the embodiment shown, a plurality of cutting devices 20 is mounted on the drum 10, each one arranged adjacent to a respective skid 11. More specifically, each cutting device 20 is arranged in a position immediately behind the corresponding skid 11 with respect to the direction of rotation of the drum 10.

Also in the embodiment illustrated, each skid 11 is provided with two relief portions 12 which are arranged mutually side by side and which extend substantially parallel to the axis of the drum 10, on which the leading and trailing edges of two consecutive labels 8*a* of the label ribbon 8 are intended to rest, while the separation portion between the two consecutive labels 8*a* is intended to be positioned between the two relief portions 12, at least when the corresponding skid 11 passes in front of the glue roller 13.

Advantageously, there are control means, constituted, conveniently, by an electronic controller 110, which make it possible to drive the unreeling assembly 7 so as to be able to vary the speed with which the label ribbon 8 is fed to the drum 10, in order to obtain the correct positioning of the labels 8*a* with respect to the skids 11 arranged on the drum 10.

The operation of the labeling machine, according to the invention, is the following.

Figure 9:
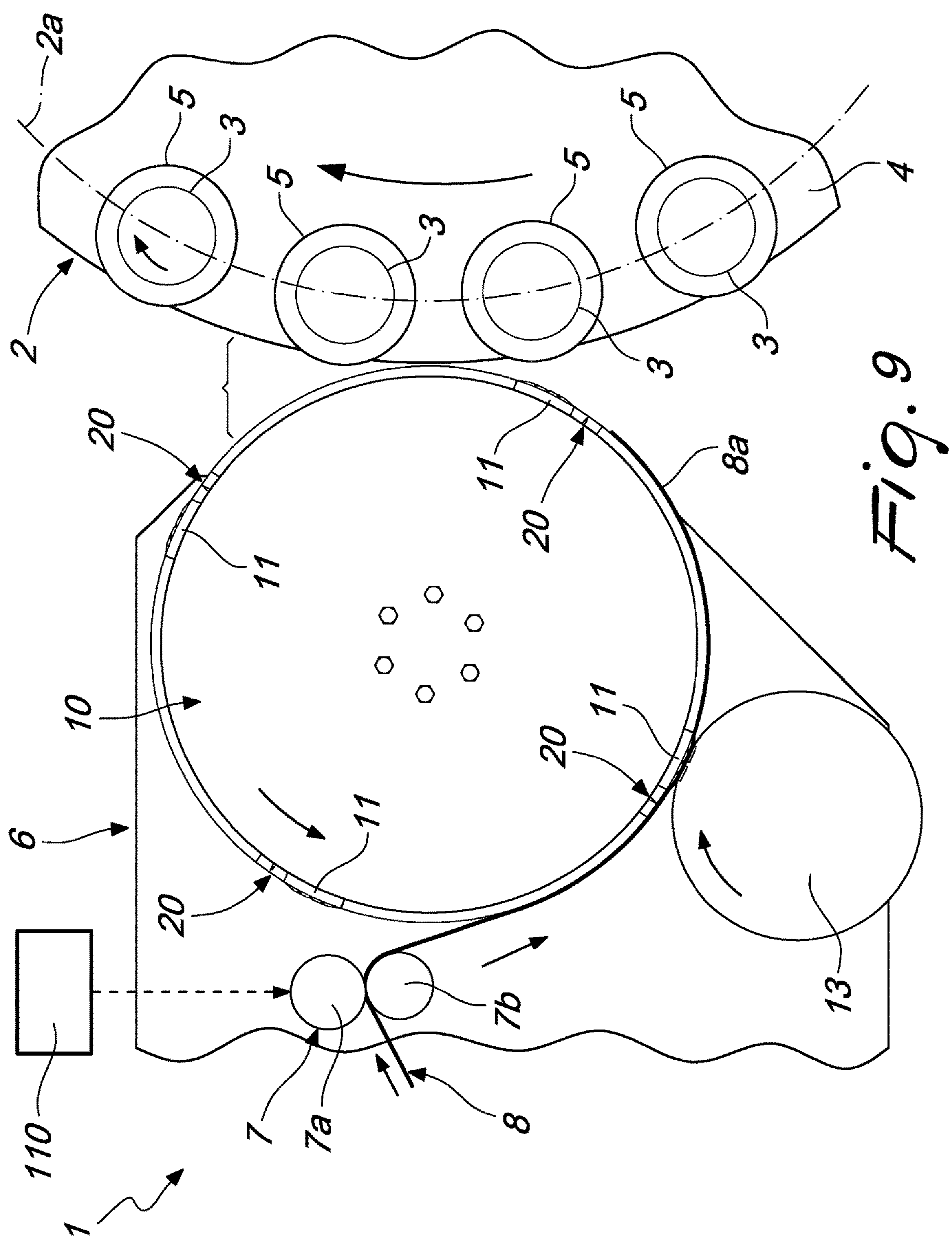
FIGS. 9, 10 and 11 are schematic plan views from above of the machine according to the invention, in a sequence of steps of its operation.

In the situation shown in FIG. 9, while the unreeling assembly 7 feeds the label ribbon 8 at a preset speed to the drum 10, which keeps it adhered to its lateral surface, by virtue both of the suction openings 10*a* arranged on that lateral surface and of the ports 18 situated at the skids 11, the trailing edge and the leading edge of two consecutive labels 8*a* of the label ribbon 8 come to be placed on one of the skids 11 of the drum 10 and at the same time this skid 11 passes in front of the glue roller 13, which then applies a layer of glue to the leading edge and to the trailing edge of the two consecutive labels 8*a*.

In this situation, by virtue of the fact that it is made of an elastically yielding material, the relief portion 12 of the skid 11 is able to deform radially, thus adapting perfectly to the conditions of pressure to which it is subjected by the glue roller 13, so as to allow the normal and correct application of the glue, even if the position of the glue roller 13 with respect to the drum 10 is not adjusted with extreme precision, or even if the geometric shape of the skid 11 is imperfect, owing for example to manufacturing errors or to changes in the shape of the skid 11 as a result of wear, and without interfering with the normal operation of the machine.

Figure 10:
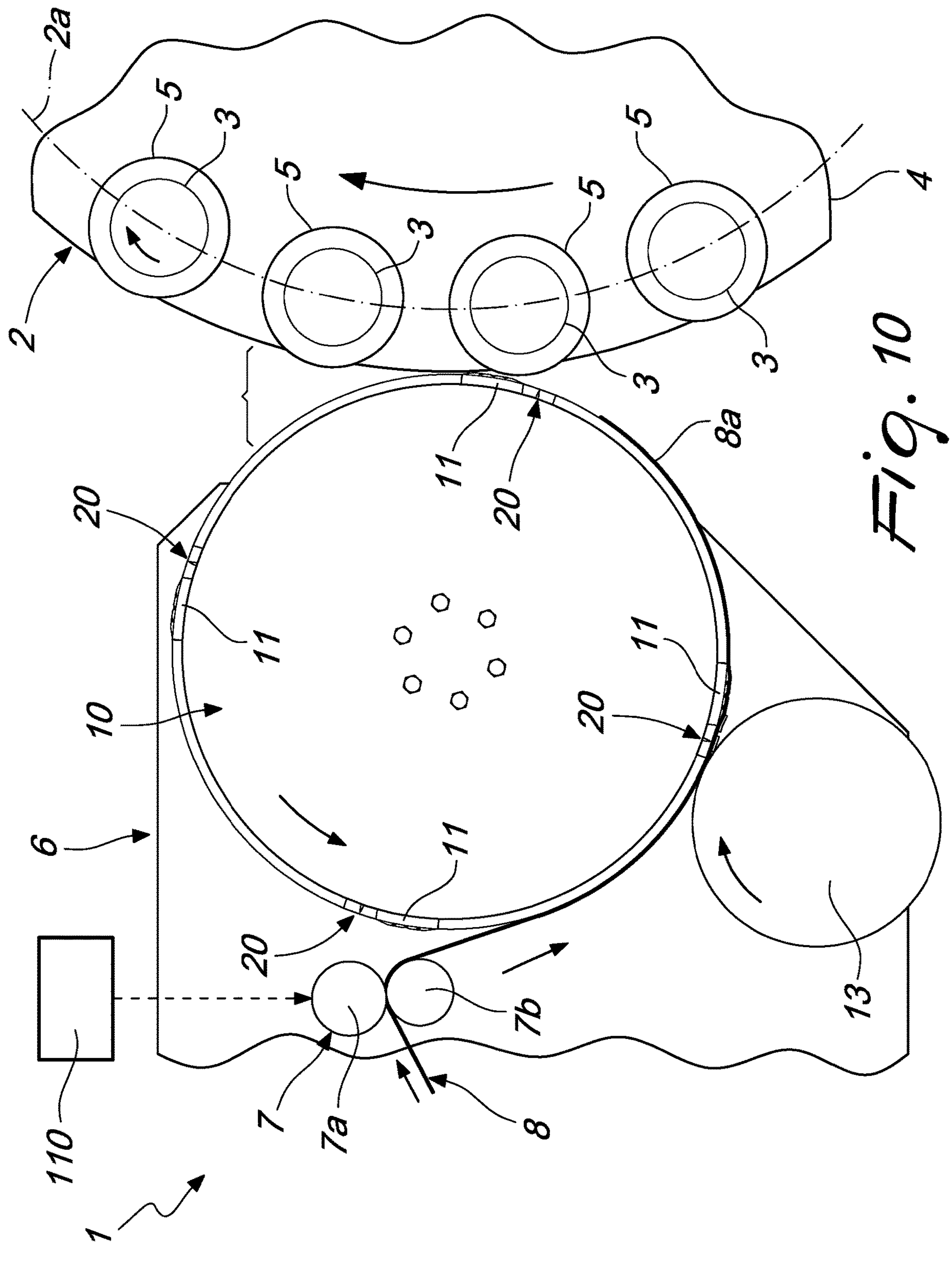

As shown in FIG. 10, once the glue is applied on the trailing edge and on the leading edge of the two consecutive labels 8*a* that are adhering to the lateral surface of the drum 10, the electronic controller 110 acts on the unreeling assembly 7 to reduce the speed with which the label ribbon 8 is fed to the drum 10, so as to obtain a slippage of the drum 10 against the label ribbon 8, which makes it possible to bring the cutting device 20 immediately behind the skid 11 that was at the glue roller 13 towards the separation region between the two labels 8*a* that have received glue.

Figure 11:
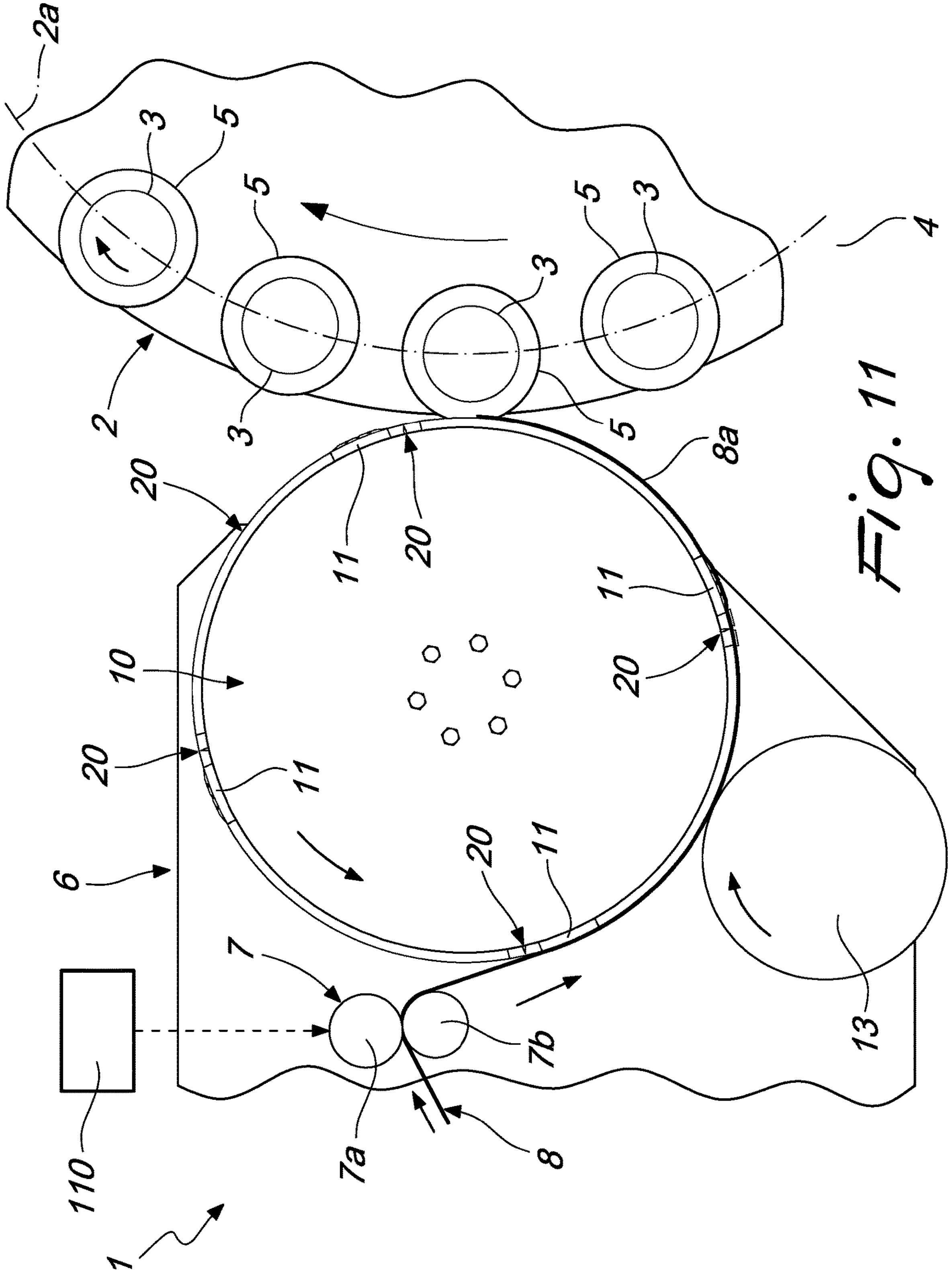

Once this cutting device 20 has reached the separation region between the two consecutive labels 8*a* with its blade 21, as shown in FIG. 11, the electronic controller 110 commands the unreeling assembly 7 to feed the label ribbon 8 to the drum 10 at a speed that is substantially equal to the peripheral speed of the drum 10.

At the same time, the cutting chamber 22 of the cutting device 20 that is located at the separation region between the two consecutive labels 8*a* is connected to the vacuum pump 100, so as to cut the label ribbon 8.

The label 8*a*, thus separated from the label ribbon 8, will subsequently be transferred from the drum 10 to the corresponding container 3 transported by the conveyor 2.

In practice it has been found that the invention fully achieves the intended aim and objects by providing a labeling machine in which not only providing the skids mounted on the drum on which the application of the glue takes place, but also the positioning of the glue roller with respect to the drum itself, is far simpler, with consequent advantages in terms of ease of construction of the machine and the cost of production thereof.

The invention thus conceived is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102021000007778 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A labeling machine, comprising: a conveyor of containers to be labeled along an advancement path and at least one labeling station, which is arranged along said advancement path, said labeling station comprising an unreeling assembly for a label ribbon, on which multiple labels are printed in succession, and at least one drum designed to receive on a lateral surface thereof said label ribbon or labels obtained by cutting said label ribbon, at least one skid being arranged at a peripheral region of said drum and having at least one relief portion with a relief directed outward with respect to a remaining part of the lateral surface of said drum, at least one glue roller being arranged laterally to said drum and being designed to apply glue at least on regions of said labels that rest on said at least one relief portion of said at least one skid, wherein at least said relief portion of said at least one skid is made of an elastically yielding material, wherein said at least one skid is constituted by a body which is made entirely of the elastically yielding material and wherein said at least one skid has at least one internal cavity which is adapted to facilitate elastic pliability at least of said relief portion.

2. The labeling machine according to claim 1, wherein said at least one skid is removably coupled to said drum at respective accommodation seats.

3. The labeling machine according to claim 1, wherein, at least in said relief portion, there are ports configured to be connected to air suction means.

4. The labeling machine according to claim 1, wherein said drum supports, peripherally, at least one cutting device configured to be actuated on command in order to cut said label ribbon.

5. A labeling machine, comprising: a conveyor of containers to be labeled along an advancement path and at least one labeling station, which is arranged along said advancement path, said labeling station comprising an unreeling assembly for a label ribbon, on which multiple labels are printed in succession, and at least one drum designed to receive on a lateral surface thereof said label ribbon or labels obtained by cutting said label ribbon, a skid being arranged at a peripheral region of said drum and having a relief portion with a relief directed outward with respect to a remaining part of the lateral surface of said drum, at least one glue roller being arranged laterally to said drum and being designed to apply glue at least on regions of said labels that rest on said relief portion of said skid, wherein said relief portion of said skid is made of an elastically yielding material, wherein said skid is constituted by a body which is made entirely of the elastically yielding material, wherein the body includes the relief portion, wherein said body includes at least one internal cavity which is adapted to facilitate elastic pliability of said relief portion relative to other portions of the body.

* * * * *